United States Patent [19]

Grenier

[11] 4,245,813
[45] Jan. 20, 1981

[54] FLUSH VALVE

[75] Inventor: Wilfred J. Grenier, Rutland, Mass.

[73] Assignee: General Industries, Inc., Rutland, Mass.

[21] Appl. No.: 932,300

[22] Filed: Aug. 9, 1978

[51] Int. Cl.$^2$ .................... F16K 31/385; F16K 21/16
[52] U.S. Cl. ...................................... 251/32; 251/45; 251/34
[58] Field of Search ....................... 251/19, 32, 15, 45, 251/46, 34

[56] References Cited

U.S. PATENT DOCUMENTS

| | | | |
|---|---|---|---|
| 1,004,650 | 10/1911 | Hilton | 251/34 X |
| 2,298,233 | 10/1942 | Ricard | 251/32 |
| 3,010,691 | 11/1961 | Canfield | 251/34 X |
| 3,674,234 | 7/1972 | Heyer et al. | 251/37 X |

Primary Examiner—Arnold Rosenthal
Attorney, Agent, or Firm—Joseph S. Iandiorio

[57] ABSTRACT

A flush valve including a housing, a removable partition sealingly engaging said housing and defining a primary chamber and a control chamber; the housing including an inlet port in the primary chamber for connection with a source of flushing fluid, and an outlet port in the primary chamber for dispensing the fluid; a valve element connected with the partition for closing the outlet port; first biasing means for producing a force on the partition to urge the valve element to close the outlet port; a passage interconnecting the primary control chambers for enabling equalization of pressure therebetween; an actuator mechanism including an actuator valve connected with the control chamber and an actuator member for setting the actuator valve to the open position to vent the control chamber and enable the valve element to move away from the outlet port and open the flush valve; and an actuator control mechanism driven by the partition as the valve element moves away from the outlet port, for driving the actuator mechanism to reset the actuator valve to the closed position and cease venting the control chamber.

10 Claims, 6 Drawing Figures

FLUSH VALVE

FIELD OF THE INVENTION

This invention relates to an improved flush valve.

BACKGROUND OF INVENTION

Conventional flush valves used with water closets, urinals and the like suffer from a number of shortcomings. For example, such flush valves require a second unit including a vacuum breaker valve or anti-siphon valve to be installed between the flush valve and water closet. This requires the manufacture of a separate unit, at additional cost to the user and, perhaps even more importantly, requires a second additional installation by a plumber which, in view of present charges for plumbing services, is a substantial expense. Such flush valves also require another, third unit to prevent unpredictable surges or increases in line pressure from causing unwanted actuation of the flush valve. This unwanted actuation is particularly troublesome when it occurs as a result of a sudden increase in line pressure or when normal line pressure is restored after the line has been drained. Under these conditions, the control chamber drains and loses pressure so that a subsequent surge or increase in pressure is able to overcome pressure in the control chamber and cause unwanted actuation of the flush valve. Again, the increased cost of this third separate unit, and the increased charge for installation, adds significantly to the user's cost. Often this third unit contains some sort of flow control device for setting the volume of water discharged per flush at the particular pressure of the supply line. This setting is done at installation by a plumber.

Presently available flush valves are difficult to actuate because the actuator is opposing line pressure. The force required for this may be difficult to apply for the young, the aged, and the infirm. In addition, the actuator mechanism functions to open, but not to close, the flush valve actuator valve. Another disadvantage of contemporary flush valves is that they must be made and stocked in each of a number of configurations with respect to the relative arrangement of the actuator handle and supply line.

SUMMARY OF INVENTION

It is therefore an object of this invention to provide an improved, simplified flush valve which is less expensive to manufacture and install.

It is a further object of this invention to provide an improved surge- and siphon-insensitive flush valve.

It is a further object of this invention to provide such a flush valve whose actuation is opposed by less than line pressure.

It is a further object of this invention to provide such a flush valve which is easily arranged with the actuator handle and supply line connection in any of a number of relative azimuthal orientations.

It is a further object of this invention to provide such a flush valve which incorporates a simple, self-adjusting flow regulating device.

It is a further object of this invention to provide such a flush valve in which the actuator mechanism functions to close as well as open the actuator valve.

The invention features a flush valve including a housing and a moveable partition sealingly engaging the housing and defining a primary chamber and a control chamber. The housing includes an inlet port in the primary chamber for connection with a source of flushing fluid, and an outlet port, also in the primary chamber, for dispensing the fluid. There is a valve element connected with the partition for closing the outlet port and first biasing means for producing a force on the partition to urge the valve element to close the outlet port. A passage, which may be constituted simply by a hole, interconnects the primary and control chambers for enabling equalization of pressure between them. There is an actuator mechanism including an actuator valve connected with the control chamber, and an actuator member for directly operating the actuator valve and setting it to the open position to vent the control chamber and enable the valve element to move away from the outlet port and open the flush valve.

An actuator control mechanism is driven by the partition as the valve element moves away from the outlet port, and drives the actuator mechanism to reset the actuator valve to the closed position and cease venting the control chamber.

In a preferred embodiment, the flush valve includes an anti-surge, anti-siphon unidirectional valve member, which permits flow through the passage from the primary chamber to the control chamber when the pressure in the primary chamber exceeds that in the control chamber. The unidirectional valve prevents flow in the other direction through the passage, from the control chamber to the primary chamber, when the pressure in the control chamber exceeds that in the primary chamber.

The flush valve may also include an auxiliary chamber which communicates with the control chamber through the actuator valve. A flow regulator outlet communicating with the outlet port and the auxiliary chamber controls discharge through the outlet port of the fluid vented through the actuator valve into the auxiliary chamber.

The flush valve housing may include a first part which carries the actuator mechanism and a second part which carries laterally extending connection means for the inlet port. One of these two parts includes a threaded section proximate its junction with the other part. There is a threaded locking ring which has a threaded portion for engaging the threaded section of the threaded part and a locking portion for engaging the non-threaded other part, for enabling the two parts to be assembled with the actuator handle and the inlet connection means in any desired azimuthal relationship.

DISCLOSURE OF PREFERRED EMBODIMENT

Other objects, features and advantages will occur from the following description of a preferred embodiment and the accompanying drawings, in which.

Figure 1:
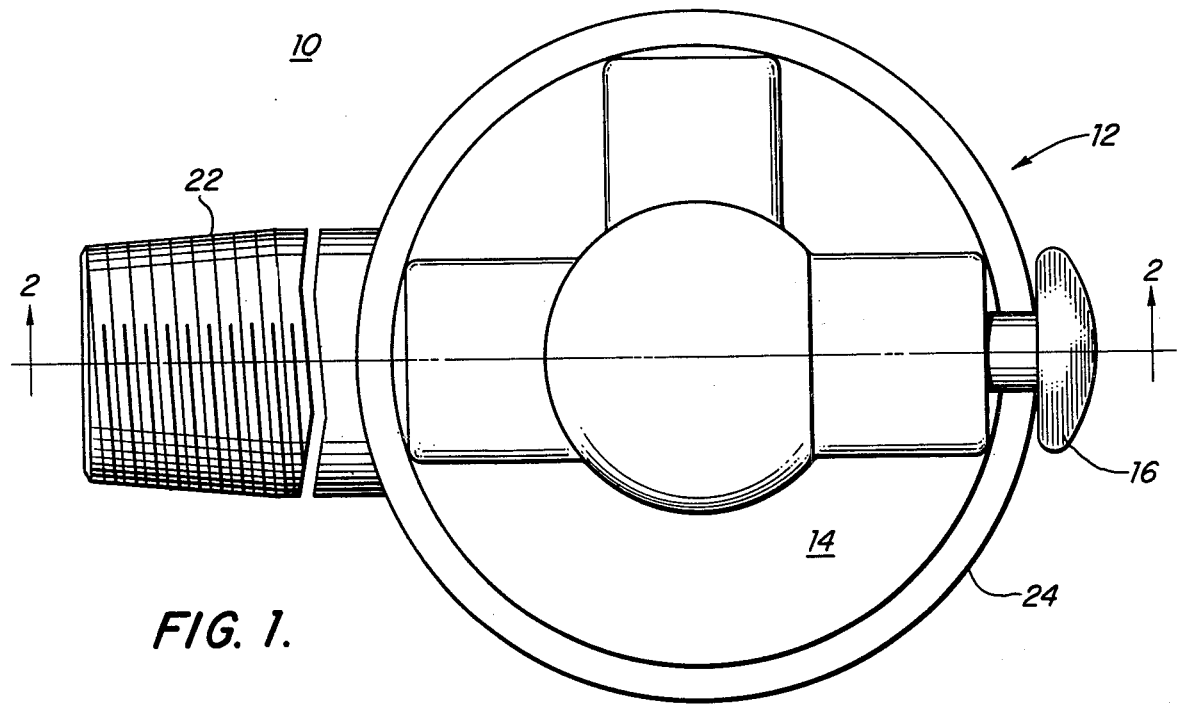
FIG. 1 is a plan view of a flush valve according to this invention.
Figure 2:
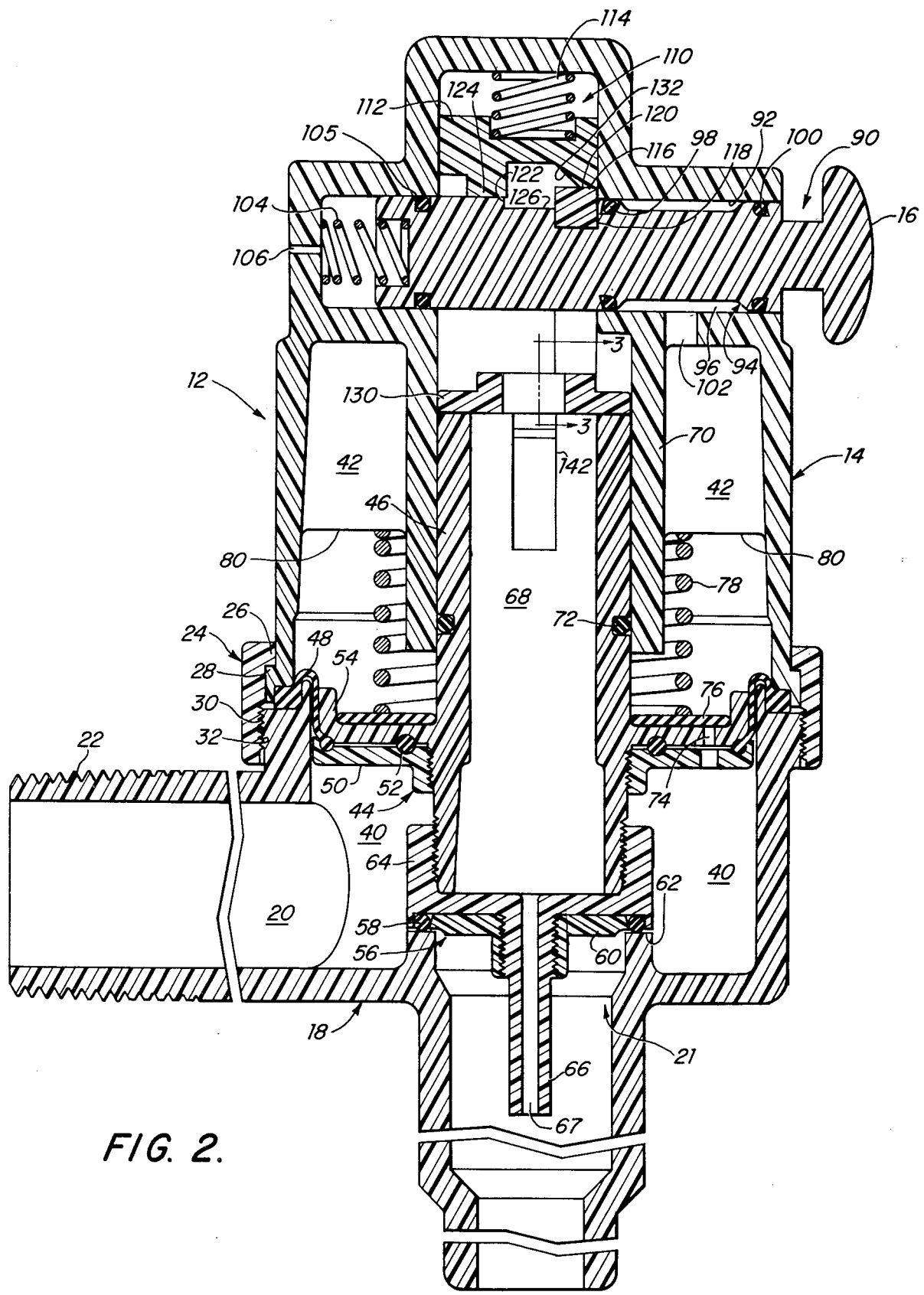
FIG. 2 is a sectional view taken along line 2—2 of FIG. 1.

There is shown in FIG. 1 a flush valve 10 according to this invention including a housing 12, including an upper part or cap 14 which contains the actuator member or handle 16, and a lower part or base 18, FIG. 2, which contains an inlet port 20 with a threaded lateral inlet extension 22 and outlet port 21. Cap 14 and base 18 are locked together by a threaded locking ring 24. Locking ring 24 has a locking portion 26 which engages a locking lip 28 on cap 12 and threads 30, which engage threads 32, on base 18. When locking ring 24 is loosened, cap 14 and base 18 may be relatively rotated to arrange actuator handle 16 and inlet extension 22 to any relative azimuthal orientation, as required by a particular installation. The cap and base will then be held in this orientation by the securing of locking ring 24.

Housing 12 is separated into two main chambers, primary chamber 40 and control chamber 42, by partition 44. Partition 44 includes hollow slide member 46, rolling diaphragm 48, which slidably, sealingly supports slide 46 with respect to housing 12, and a diaphragm locking plate 50, which threadably engages slide 46 and compresses the inner end of diaphragm 48 and "O" ring 52 against flange 54 of slide 46. The other end of diaphragm 48 is gripped between cap 14 and base 18 by means of locking ring 24. At its lower end partition 44 includes a valve element 56 including "O" ring 58 and "O" ring locking plate 60, which holds "O" ring 58 in the proper position for contacting the seat 62 of outlet port 21. Outlet port valve element 56 is carried by flow regulator member 64, which is threadedly engaged with the lower end of slide member 46 and includes a depending tubular extension 66 which threadably engages with locking plate 60 and contains duct 67 which connects auxiliary chamber 68 formed within slide 46 with outlet port 21, and which functions as a flow regulating outlet. Slide 46 is slidable in guide 70, which is a portion of cap 14, and is sealingly engaged with guide 70 by means of "O" ring 72.

Passage or hole 74 in flange 54 of slide 46 and plate 50 interconnects primary chamber 40 and control chamber 42 and enables equalization of pressure therebetween. A unilateral valve member, resilient washer 76, covers the end of hole 74 in control chamber 42, and is urged in the direction to close hole 74 by a biasing member, spring 78, which contacts webs 80 of cap 14 and also acts to urge slide 46 downward and to keep valve element 56 closed on outlet port 21.

Actuator handle 16 forms a portion of actuator mechanism 90, which is slidably housed in bore 92 of cap 14. Actuator mechanism 90 also includes an actuator valve 94 formed by recess 96 between "O" ring seals 98 and 100. Actuator valve 94 vents control chamber 42 through port 102 into auxiliary chamber 68 when actuator handle 16 is pressed inwardly, to the left in FIG. 2. Actuator mechanism 90 also includes biasing means, spring 104, which urges handle 16 to the right and actuator valve 94 to the closed position. A breather hole 106 is provided in cap 14 to prevent excessive back pressure from building up as a result of the sealing function of "O" ring 105 when actuator handle 16 is moved inwardly.

Actuator control mechanism 110 includes locking member 112 which is biased downwardly by means of spring 114, and reset member 116, which is received in recess 118 in actuator handle 16.

Figure 3:
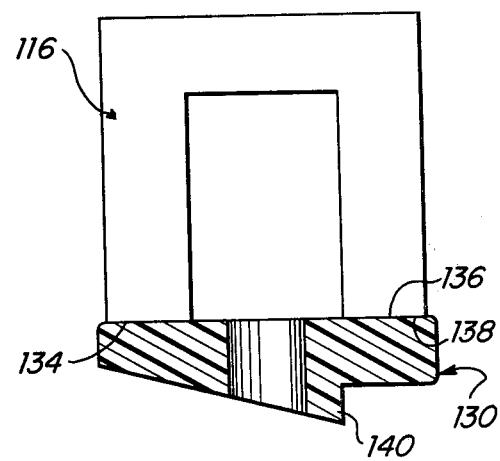
FIG. 3 is a sectional view of a follower member driven with the partition and a reset member resting on the follower member.
Figure 4:
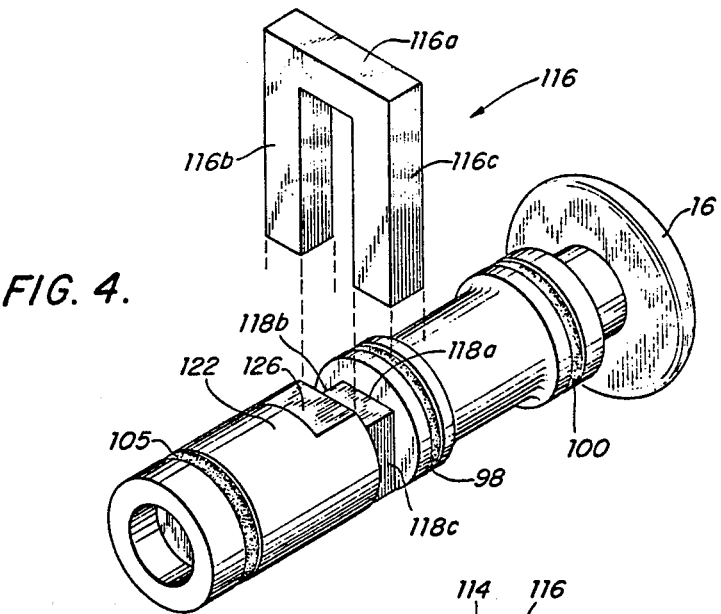
FIG. 4 is an axonometric view of a portion of the actuator mechanism and actuator control mechanism.

Reset member 116 slides along the top surface of follower member 130 when actuator handle 16 moves left and right, FIG. 3; reset member 116 has its lower ends 134 and 136 resting on the upper surface 138 of follower member 130. The lower extension 140 of follower member 130 fits in slot 142, FIG. 2, of slide 46. Reset member 116 includes a top portion 116a and two legs 116b, 116c, FIG. 4, which are received in top channel 118a and side channels 118b, 118c, respectively, of recess 118 in handle 16. Thus member 116 is retained by channels 118b, c, to move with handle 16 even when member 116 is driven upward and portion 116a is clear of channel 118a.

When actuator handle 16 is moved to the left to open actuator valve 94 and vent control chamber 42 through port 102 into auxiliary chamber 68, reset member 116 moves out from under portion 120 of locking member 112, and shoulder 122 moves to the left, clear of detent 124 which, under the urging of spring 114, is pressed into recess 126, where it abuts against shoulder 122. Thus actuator handle 16 is locked in that position with actuator valve 94 in the open position. When subsequently partition 44 moves upwardly, moving valve element 56 to open outlet port 21, the upper end of slide 46, either directly, or indirectly through an intermediate member such as follower member 130, contacts the lower end of reset member 116 and moves it upwardly; this drives locking member 112 upwardly against the force exerted by spring 114, lifting detent 124 out of recess 126, clear of shoulder 122, thereby permitting actuator handle 16 to return to the normal position with actuator valve 94 in the closed position.

This movement produced by the retraction of detent 124 is sufficient for "O" ring 98 to reestablish a seal with bore 92 and close actuator valve 94. Subsequently, when the outlet port is closed by valve element 56 as partition 44 descends, reset member 116 is permitted to drop, as a result of the descent of follower member 130 and/or slide 46, so that reset member 116 gradually moves down along inclined surface 132 of locking member 112 until it resumes its initial position as shown in FIG. 2.

Initially, an inlet line connected to inlet extension 22 provides flushing fluid such as water at inlet port 20. This water moves through hole 74, pushing resilient washer 76 out of the way and entering chamber 42. Finally, when control chamber 42 is full, the pressure, plus the urging of spring 78 on washer 76, seals hole 74 so that further transfer at the present inlet pressure of water between primary chamber 40 and control chamber 42 is not possible. In this condition flush valve 10 is fully operational and awaiting actuation. The pressure in control chamber 42 urges partition 44 downward so that "O" ring 58 seals against seat 62 to close outlet port 21. In this condition, a sudden vacuum occurring at inlet extension connection 22 produces a negative pressure in hole 74 with respect to the pressure in control chamber 42 so that washer 76, performing as a unidirectional valve, is caused to even more tightly seal hole 74 and even more strongly force "O" ring seal 58 against seat 62 to more securely close the outlet port 21 and prevent any siphoning effect which might draw water from the water closet up through the outlet port 21 and back into the supply line connected at inlet extension 22. Thus flush valve 10 includes as an integral part an anti-siphon feature which seals the outlet port even more strongly when the line pressure decreases or virtually disappears.

The unidirectional valve constituted by resilient washer 76 also performs a second function: it acts as an anti-surge valve to prevent sudden increases in pressure from accidentally, unwantedly actuating flush valve 10. Surges occur when the pressure at inlet port 20 is reestablished following a siphoning condition or when normal pressure in the line is suddenly exceeded by a sudden surge of increased pressure. In either case, the sudden increase of pressure is communicated immediately, directly through hole 74, where it pushes resilient washer 76 out of the way and enters control chamber 42, increases the pressure that is pressing downward on partition 44, and provides increased sealing force for valve element 56 at outlet port 21. Thus upon the appearance of this excess pressure or surge the valve is only closed more tightly, and upon its disappearance the increased pressure now stored in control chamber 42 continues the increased sealing pressure, which keeps closed outlet port 21.

Figure 5:
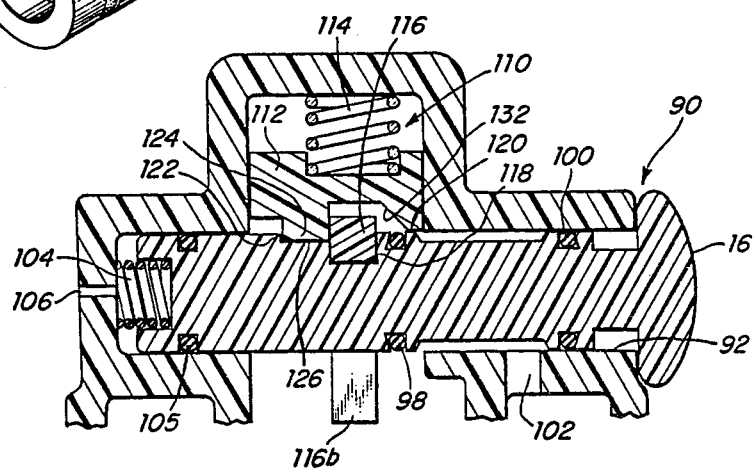
FIG. 5 is a sectional view of the parts of the actuator control mechanism and actuator mechanism upon actuation of the valve.
Figure 6:
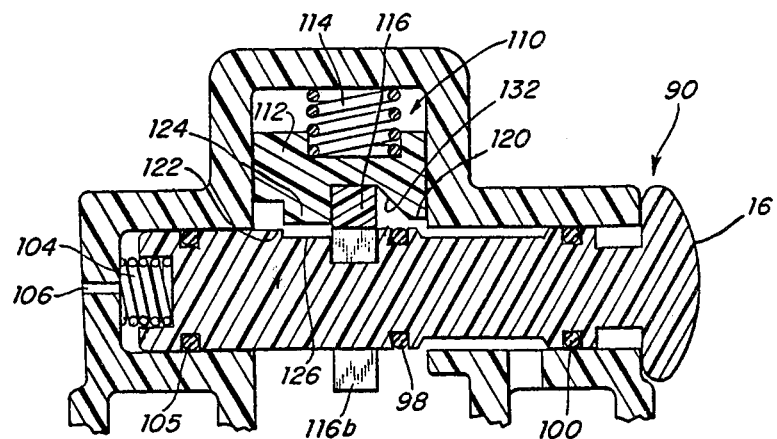
FIG. 6 is a sectional veiw similar to FIG. 5 after opening of the valve as the actuator mechanism begins to reset.

In operation, the user presses actuator handle 16 inwardly against the force of spring 104 only, and does not need to oppose line pressure or any substantial component of line pressure. Upon actuator handle 16 being moved inwardly, to the left in FIG. 5, actuator valve 94 is opened so that control chamber 42 vents through port 102 into auxiliary chamber 68. At this point shoulder 122 has cleared detent 124, FIG. 5, and detent 124 has descended and is holding actuator handle 16 in the actuated position, whereby actuator valve 94 is in the open position. The venting of the water in control chamber 42 into auxiliary chamber 68 decreases the pressure on partition 44 and permits the line pressure in primary chamber 40 to move partition 44 upwardly. This movement moves reset member 116 upwardly and drives locking member 112 upwardly against the force exerted by spring 114, lifting detent 124 out of recess 126 and clear of shoulder 122, FIG. 6. Spring 104 now urges handle 16 with member 116 to the right.

As partition 44 moves upwardly, valve element 56 moves off seat 62 and the flow begins from inlet port 20 to outlet port 21, instituting the flushing action. The height to which partition 44 rises, and thus the size of the opening which is provided between valve element 56 and outlet port 21, is in part controlled by duct 67, which restricts the flow of water from auxiliary chamber 68 and thereby limits somewhat the height to which partition 44 rises and the extent to which port 21 is opened by the movement of partition 44. As the flushing action continues, water from primary chamber 40 is driven through hole 74, past resilient washer 76 into control chamber 42, which is now at much lower pressure. As control chamber 42 begins to fill and the downward force on partition 44 increases, partition 44 begins to move downwardly, restricting to an even greater degree the opening between valve element 56 and outlet port 21 and permitting follower 130 to drop down with slide 46 and re-assume their initial positions. As follower 130 drops, member 116 is urged to drop by member 112 under force of spring 114. The force of springs 104 and 114 urge member 116 to the right and down, respectively. The upper right hand corner of member 116 slides down along surface 132. Finally, valve element 56 closes outlet port 21, control chamber 42 once again has its pressure equalized with that of primary chamber 40, actuator handle 16 is in its normal position, as shown in FIG. 2, and flush valve 10 is once again ready for operation.

Other embodiments will occur to those skilled in the art and are within the following claims:

What is claimed is:

1. A flush valve comprising: a housing; a moveable partition sealingly engaging said housing and defining a primary chamber and a control chamber; said housing including an inlet port in said primary chamber for connection with a source of flushing fluid, and an outlet port in said primary chamber for dispensing said fluid; a valve element connected with said partition for closing said outlet port; first biasing means for producing a force on said partition to urge said valve element to close said outlet port; a passage interconnecting said primary and control chambers for enabling equalization of pressure therebetween; an auxiliary chamber in communication with said control chamber through said actuator valve and a flow regulating outlet communicating with said outlet port and said auxiliary chamber for discharging the fluid vented through said actuator valve; an actuator mechanism including an actuator valve connected with said control chamber and an actuator member for setting said actuator valve to the open position to vent said control chamber and enable said valve element to move away from said outlet port and open said flush valve; and an actuator control mechanism driven by said partition as said valve element moves away from said outlet port, for enabling said actuator mechanism to reset said actuator valve to the closed position and cease venting said control chamber.

2. The flush valve of claim 1 further including an antisurge, anti-siphon unidirectional valve member for permitting flow through said passage from said primary chamber to said control chamber when the pressure in said primary chamber exceeds that in said control chamber and preventing flow in the other direction through said passage from said control chamber to said primary chamber when the pressure in said control chamber exceeds that in said primary chamber.

3. The flush valve of claim 2 in which said unidirectional valve member includes a resilient material mounted in said control chamber covering said passage.

4. The flush valve of claim 1 in which said partition includes a diaphragm, sealingly engaged with said housing.

5. The flush valve of claim 1 in which said partition includes a slide member for operating said actuator control mechanism.

6. The flush valve of claim 1 in which said actuator control mechanism includes a locking member for holding said actuator valve in the open position after its setting by said actuator member and a reset member for disengaging said locking member in response to movement of said partition as said valve element moves away from said outlet port.

7. The flush valve of claim 1 in which said actuator mechanism includes second biasing means for urging said actuator valve to the closed position.

8. The flush valve of claim 6 in which said locking member includes third biasing means for urging said locking member towards the locking position.

9. The flush valve of claim 1 in which said housing includes a first part including said actuator mechanism, a second part including laterally extending connection means for said inlet port, one of said parts including a threaded section proximate its junction with the other, and a threaded locking ring having a threaded portion for engaging said threaded section, and a locking portion for engaging the other part for enabling said parts to be assembled with said actuator mechanism and said connection means in any desired azimuthal relationship.

10. The flush valve of claim 7 further including a follower member for transmitting motion of said partition to said reset member.

* * * * *